(12) United States Patent
Feger et al.

(10) Patent No.: US 6,217,185 B1
(45) Date of Patent: Apr. 17, 2001

(54) EFFICIENT BACKLIGHTING FOR A PORTABLE DISPLAY

(75) Inventors: Claudius Feger, Croton on Hudson, NY (US); Robert Lee Sandstrom, New Canaan, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/265,137

(22) Filed: Mar. 8, 1999

(51) Int. Cl.$^7$ ........................................................ F21V 7/04
(52) U.S. Cl. ................................. 362/31; 362/26; 362/561
(58) Field of Search .................................. 362/26, 27, 31, 362/561

(56) References Cited

U.S. PATENT DOCUMENTS 5,883,684 * 3/1999 Millikan et al. ..................... 362/31 X

OTHER PUBLICATIONS

Gordon et al, "Achieving Uniform Efficient Illumination With Multiple Assynetric Compound Parabolic Luminaires", SPIE, vol. 2016, Nonimaging Optics (1993) pp. 27–37.

Whitehead etal, "Light–Distribution Methods for Backlighting LCDs" SID 92 Digest pp. 419–422.
3M Sales Literature on Optical Enhancement Films: BEF II, DBEF,IDF II, and TRAF II, dated 1996, 21 pages.*
LCD Lighting Inc. brochure dated 1991, 2 pages.*
JKL Components Corp. brochure dated 1994, 2 pages.*

* cited by examiner

Primary Examiner—Stephen Husar
(74) Attorney, Agent, or Firm—Daniel P. Morris; Alvin J. Riddles

(57) ABSTRACT

Efficiency in light transfer between a light source and a viewing screen is attained in the invention by positioning a small diameter source of light at a position of highest light transfer intensity within an essentially semicircular reflector interfacing at the wide portion of a wedge shaped light pipe light transfer member and minimizing reflection losses at every optical interface in the light path between the light source and the viewer. A wedge shaped light pipe light transfer member of the invention has attached a light source with unit diameter light bulb positioned off center of a four unit diameter semicircular solid reflector of a transparent material that is closely index of refraction matched with index of refraction of a wedge shaped light pipe light transfer member on the upper face of which is positioned the addressable viewing screen and, the portion of the wedge shape light pipe light transfer member being terminated in a reflection preventing face that is at about 45 degrees from the centerline of the wedge shaped member.

12 Claims, 1 Drawing Sheet

EFFICIENT BACKLIGHTING FOR A PORTABLE DISPLAY

FIELD OF THE INVENTION

The invention is directed to the backlighting of a display for electronic apparatus such as a portable battery powered notebook type computer and in particular to the structural principles for the efficient transfer of light from a small source, through a wedge shaped light pipe, to a broad display area.

BACKGROUND AND RELATION TO THE PRIOR ART

The display portion of a portable electronic device such as a portable notebook computer usually has an addressable viewing screen area where information is displayed, by the effect of changes in light, in individual pixel increments of liquid crystal material, that passes through the viewing screen from behind. While it is the addressable matrix in the viewing screen that supplies the information in the display, the ability to see the information is directly dependent on the light that is passed through the viewing screen.

Some of the optical considerations in handling the light distribution and achieving uniform illumination have been discussed in the art in an article by Whitehead et al. titled "Light-Distribution Methods for Backlighting LCD's" in the 1992 SID DIGEST pages 419–422; and in an article by J. M. Gordon et al. titled "Achieving Uniform Illumination with Multiple Asymmetric Compound Parabolic Luminaires" in the SPIE Vol. 2016 Nonimaging Optics (1993) pages 27–37.

As the art progresses into portable electronic apparatus, a new major consideration is taking on increasing importance. It is becoming necessary to get the most performance out of the apparatus for the weight and volume involved. In portable apparatus the power is usually provided by a battery that occupies a portion of the package volume. There is limited ability to increase battery size without also affecting the weight and volume of the overall apparatus package. It is thus essential to provide the apparatus with an energy consumption efficiency that will expand the time the unit can operate on a battery.

One of the most energy hungry and wasteful energy drains in the display portion of an electronic apparatus is in the light that is employed in the back lighting of the display. It is of great importance to maximize the efficiency ratio relating the light that is projected at the viewer with the light that is produced in the light bulb. There is however a constraint, that is more serious in portable apparatus, that the aspect ratio of any optical path for backlighting will be such that while the light must come from behind the viewing screen over a broad area, any space perpendicular to the screen occupied by the light path may have to be quite small.

The art, in addressing this constraint, has developed the use of a transparent wedge shaped light pipe member of a material such as a clear polymer, that is positioned supporting the screen area with the tapered dimension of the wedge aligned with one edge of the screen area. A long light bulb serving as a light source is positioned within a reflector and is used to direct light along it's length, into the wide portion of the wedge shaped light pipe. The light is dispersed in the wedge shaped light pipe and the direction is changed so that it passes through the display screen evenly over the display area.

In such a configuration, however, there are losses in connection with the many parts of the light path from the light bulb to the viewer of the display screen.

SUMMARY OF THE INVENTION

Efficiency in light transfer between a light source and a viewing screen is attained in the invention by positioning a small diameter source of light at a position of highest light transfer intensity within an essentially semicircular reflector interfacing at the wide portion of a wedge shaped light pipe light transfer member and g reflection losses at every optical interface in the light path between the light source and the viewer.

A wedge shaped light pipe light transfer member of the invention has a unit diameter light bulb positioned below the center of a four unit diameter semicircular solid reflector of a transparent material that is closely index of refraction matched with the material of the wedge shaped light pipe and attached at the wide portion of the wedge shaped light pipe light transfer member on the upper face of which is positioned the addressable viewing screen and, the narrow portion of the wedge shape light pipe light transfer member being terminated in a back reflection preventing face that is at an about 45 degree angle from the centerline of the wedge shaped member.

DESCRIPTION OF THE INVENTION

Figure 1:
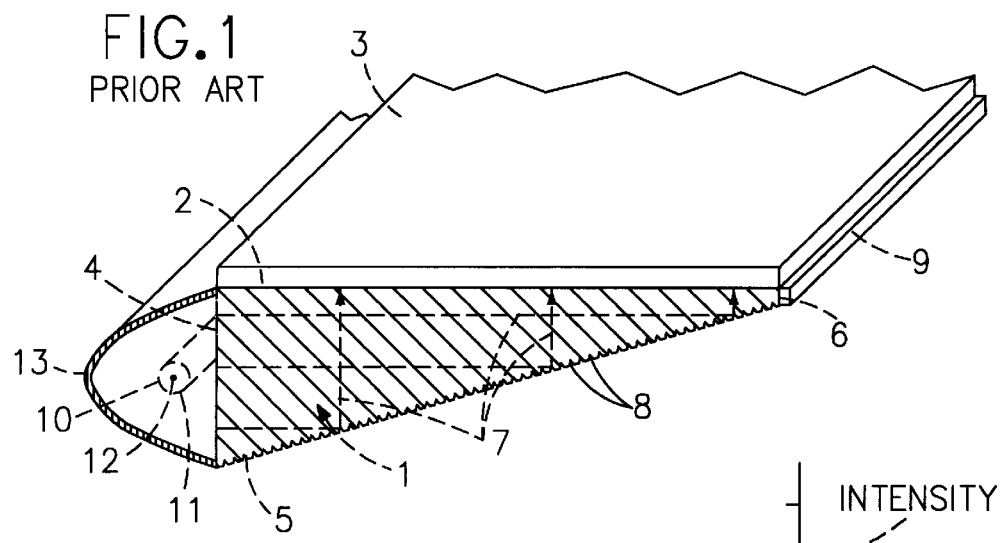
FIG. 1 is a perspective schematic illustration depicting the elements involved in wedge shaped light pipe light transferring, as practiced in the prior art.

In the wedge shaped light pipe light transferring, as practised in the prior art and as depicted in FIG. 1; the function performed is to deliver to a viewer of the display screen the maim of the light provided by a light source, in a uniform distribution, through all the addressable pixels in the whole viewing area or screen.

FIG. 1 shows a partial perspective view of a wedge shaped light pipe member 1 supporting on the surface 2 an addressable display screen 3 containing a liquid crystal, pixel increments of which are caused to pass light from the surface 2 to a viewer in response to location addressing circuitry not shown. In FIG. 1 the wedge shaped light pipe member 1 has a wide end face 4 at the ends of which are separated converging faces 2 and 5, and a smaller end face 6. The wedge shaped light pipe member 1 operates to change the direction of light, shown symbolically as arrows 7, that is introduced at the wide end face 4, by reflection from the converging face 5 which is provided with dispersing ridges or rulings 8 so as to cause the light to be changed in direction and to be directed uniformly over a broad area through the converging face 2 and then through the addressable display screen 3 which is positioned in contact with the converging face 2. The wedge shaped member 1 is usually made of a clear polymer such as polycarbonate or acrylic.

The smaller end surface 6, and the side surfaces of the wedge shaped member 1, including the side through which the view of FIG. 1 takes place, and the opposite side that is out of view in this Figure, are covered with reflective material 9 to contain the light. The reflective material can be a metal or a white reflective coating.

Continuing in connection with FIG. 1, in the prior art type of construction, light, that is to enter the light path through the face at the wide end 4 of the wedge member 1, is provided by positioning a small diameter light bulb 10, the periphery of which is partially shown dotted as 11 at a location 12 which is the focal point in a conventional usually of metal parabolic or square backlight reflector 13. The bulb 10 in the reflector 13 extends along the entire length of the wide end 4 of the partially visible reflector 13. The structure of the light at the focal point of a parabolic reflector causes all reflected light rays to be parallel.

There are a number of structural variations in structures used in the prior art but they have in common that the light bulb and reflector are an assembled separate unit that is positioned along and on the wide end 4 of the wedge member 1. The widest separation dimension between the converging faces 2 and 5, at the wide end is usually the maximum allowable distance away from the display screen 3 that would be allowable in the packaging of the display apparatus.

There are other items, the performance of which are not affected by the invention that are used in connection with the wedge light paths used in the prior art that are not shown in connection with FIG. 1. For example performance enhancement films, may be positioned at the faces 2 and 5 of the wedge shaped member 1, such as a brightness enhancing film on the face 5, and diffusing and polarizing films on the viewing surface of the display screen 3.

In such a prior art light path configuration as is illustrated in connection with FIG. 1 there will be important shortcomings that are alleviated through the invention. One is that in every optical, system there will be a loss due to reflection at every optical interface encountered by the light in the light path from the light source to the viewer so that efficiency in transfer is gained through minimization or elimination of interface reflection. Another is that there will be a loss in the coupling of the light source to the wedge shaped member so that a more efficient coupling provided by the invention enhances efficiency. Still another is that reflection directly back into the wedge produces an efficiency loss that the invention alleviates by providing a reflecting angle at the convergence region of the converging faces.

In accordance with the invention, light source positioning is structurally arranged to deliver the highest intensity light and then the highest intensity light is farther enhanced with an index of refraction match at the wide wedge shaped light pipe optical interface. The structural arrangement is both useful as an independent attachment to a prior art type wedge shaped light pipe replacing such elements as 10–13 of FIG. 1, and, as part of an improved wedge shaped light pipe of the invention as will be described in connection with FIG. 4.

Considering first the structural arrangement of the invention in the delivery of the highest intensity light to the wedge shaped light pipe.

In the structure of FIG. 1, the prior art, where a relatively smaller diameter bulb light element 10 is positioned at the focal point in a partially surrounding parabolic reflector 13 there will be a loss of some reflectable light due to a shadow, of the light bulb 10 itself, in the reflected light pattern and there will be a further loss at the interface with the wide end 4 of the wedge shape light pipe member where the light passes from the air within the hollow reflector 13 into the material of the wedge shape light pipe material.

In accordance with this invention such losses can be alleviated by the combined structural features of positioning the light bulb off the centerline of a partially surrounding circular reflector and causing the region between the light bulb, the reflector and the wide end of the wedge shaped light pipe to be of a refractive index that is matched to that of the material of the wedge shaped light pipe member with which it is to be assembled.

Figure 3:
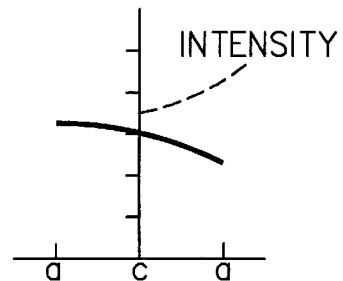
FIG. 3 is a graph illustrating the variation of light intensity with light source position in the reflector member of FIG. 2.
Figure 2:
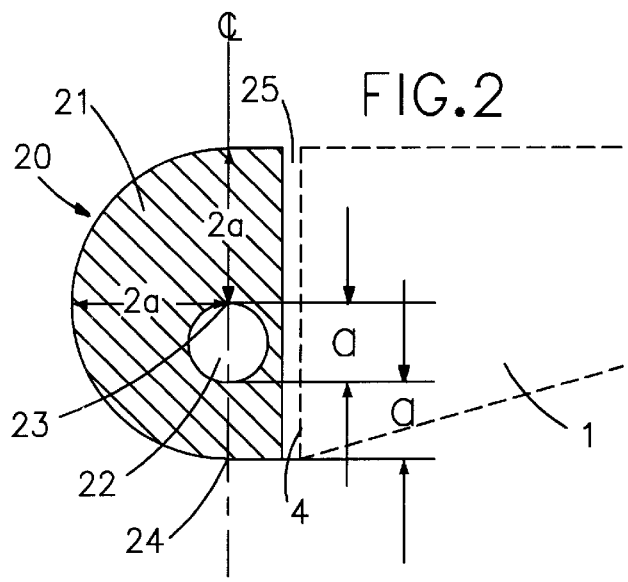
FIG. 2 is a cross sectional illustration of the off center light source reflecting element of the invention.

Referring to FIGS. 2 and 3, in FIG. 2 there is shown an illustration in cross section of the off center light partially surrounded by a circular reflector element of the invention, in position adjacent to the wide end 4 of a wedge shaped light pipe 1, shown dotted, and in FIG. 3 there is shown a graph illustrating the variation of light intensity achieved when the light is positioned off center and the partially surrounding reflector is circular. The term light bulb is relative in that any shape that will satisfy the location limitations will be satisfactory. In FIG. 2, with a circular reflector member 20 of a material 21 having an index of refraction match with the material of the wedge member 1 to which it is to be attached, and having a diameter dimension "4a"; a "1a" diameter light bulb accommodating bore 22 is positioned along the "4a" length vertical diameter of the circular reflector member 20 through the center 23 with a "1a" length distance remaining to the periphery at 24. As an illustration for a screen area of about 192 square centimeters a value of "a" of about 3 millimeters would be satisfactory. In the structure of FIG. 2, light rays emitting from a light bulb positioned in the bore 22 are all emitted tangentially from the reflector 20 and will not return on the original path. The structure of FIG. 2 when attached as shown in FIG. 1 replacing elements 11–13 results in much more light being delivered through the face 2 to the screen 3.

The intensity benefit achieved through the off center light bulb positioning is illustrated in connection with FIG. 3.

Referring to FIG. 3, a graph is provided illustrating the variation in intensity of the output light in relation to the placement of the bore 22 of FIG. 2 in units of bore 22 diameter "a." As a measure of the benefit from the positioning, off center, of the light bulb in the bore 22 an approximately 5% increase in transmitted light intensity is gained.

It will be apparent that the reflector member 20 can be a reflective coating on circular surface of the index of refraction matched material 21.

The structure of FIG. 2 in addition to the increased light intensity delivered also sharply reduces the loss that takes place when the light rays cross the interface 25 and enter the wide end 4 of the wedge shaped light pipe member 1, a portion of which is shown dotted in FIG. 2. The amount of loss at an optical interface is greater as any mismatch in index of refraction at the interface increases. As relative index of refraction values; transparent materials such as plastics have a relatively high index of refraction of about 1.54–1.56, glass also has a relatively high index of refraction of about 1.48–1.56, in contrast to air, used heretofore in the FIG. 1 type art, which has a relatively low index of refraction of about 1.00.

The structure of FIG. 2 will provide an increased efficiency light source for a wedge shaped light pipe member when applied as shown to the interface with the dotted portion. The attachment can be made with a peripheral adhesive at the edge. Phase matching fluids applied in the interface further reduce the effects of any imperfections in the interface 25.

Figure 4:
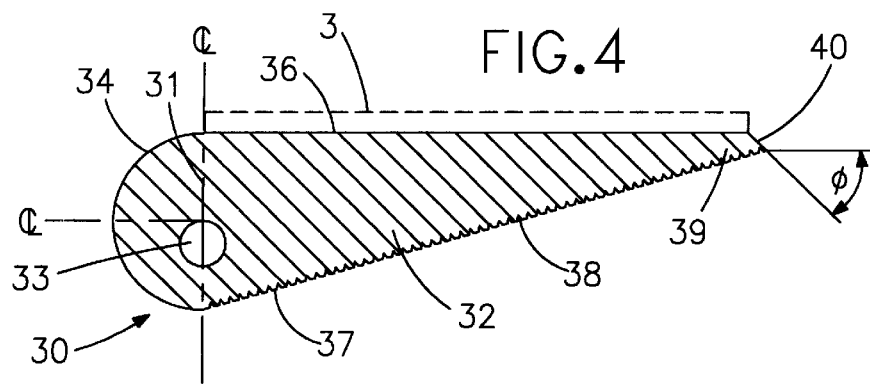
FIG. 4 is a schematic depiction of a monolithic, off center light source, wedge light transfer element of the invention.

Referring to FIG. 4, a monolithic design of the invention is illustrated. In FIG. 4, the wedge shaped light pipe member, and the light source partially surrounded by a reflector, functions are constructed in a monolithic single index of refraction material, thereby eliminating any optical interface loss. Back reflection at the narrow end of the wedge is minimized by an angular termination. In the cross sectional illustration of FIG. 4 the monolithic structure is element 30, in which at the wide end 31 of the wedge portion 32, there is a "4a" length for the wide end 31. The circular light source portion, is made up of an "a" diameter bore 33 within the circular curved surface 34 having a "2a" radius. The circular light source portion is covered with a reflective coating of a material such as vacuum deposited metal The location of the diameter 31 also serves as a locator for the edge of the screen 3 shown dotted and positioned in contact with face 36 of the wedge shaped member when the display is assembled. The bore 33 with it's "1a" diameter is positioned on the centerline (₵) of element 30, a "1a" distance above the intersection of diameter 31 with face 37.

The face 37 is provided with ridges 38 that are standard in the art and which tend to direct reflection of light rays toward the face 36 and into the screen 3. At the narrow end 39 of the wedge 32 an anti back reflection portion 40 is provided forming an about 45 degree angle ($\phi$) with respect to the face 36 to insure that all reflected light is directed so that it contributes to the light delivered through the face 36 to the screen 3.

The structure of FIG. 4 achieves a 20% to 50% luminescent efficiency over the prior art type of structure of FIG. 1.

What has been described is a technique of delivering high efficiency of light transfer in a wedge shaped light pipe display by positioning a small diameter source of light at a position of highest light transfer intensity within an essentially semicircular reflector interfacing at the wide portion of a wedge shaped light pipe light transfer member and minimizing reflection losses at every optical interface in the light path between the light source and the viewer.

What is claimed is:

1. A light source efficiency enhancing improvement for a display comprising:
    an improved light source that is retained in a supporting material, said supporting material having an index of refraction that matches the index of refraction of the material of a wedge shaped light pipe that is positioned in said display between said light source and a viewing screen of said display,
        said wedge shaped light pipe having a wide end separating converging faces,
            said wide end serving as a receiving interface for light from said light source,
            said viewing screen being in contact with a first of said converging faces, and,
    locating the light bulb of said light source in said supporting material in accordance with the highest light transfer intensity including being partially surrounded by a circular light reflector.

2. The light source attachment of claim 1 including attachment to said light receiving interface at said wide end of said wedge shaped light pipe.

3. The light source efficiency enhancing improvement for a display of claim 1 where said light source and said wedge shaped light pipe are a single physical element.

4. The light source efficiency enhancement of claim 3 including a back reflection angular face at a narrow intersection of said converging faces of said wedge shaped light pipe.

5. The light source efficiency enhancing improvement of claim 1 wherein said locating of the light bulb of said light source in said supporting material in accordance with the highest light transfer intensity includes positioning in a bore located off center of said surrounding circular light reflector.

6. In a display in which light from a side light source is brought through a wedge shaped light pipe where it is directed through an addressable liquid crystal viewing screen mounted on a face of said light pipe, the improvement comprising:
    a light supporting member of a material having,
        an index of refraction that matches the index of refraction of the material of said wedge shaped light pipe, and a semicircular surface with light reflecting capability,
        a maximum intensity light source location, wherein a localized light source is positioned off center of said reflecting capability, and,
        a light delivery interface for delivery of direct and reflected light from said reflecting capability.

7. The improvement of claim 6 including attachment of said light supporting member at said delivery interface as input to said wedge shaped light pipe.

8. In a display of the type wherein light from a light source is delivered through a first face of a wedge shaped light pipe having converging faces and through an addressable liquid crystal screen mounted on said first face of said light pipe, to a viewer, the light delivery efficiency improvement comprising:
    said light source being located in a supporting material having an index of refraction that matches the index of refraction of the material of said wedge shaped light pipe, and,
    the location of said light source in said supporting material being at the highest light transfer intensity within an at least partially surrounding circular light reflector.

9. The display improvement of claim 8 wherein both said supporting material and said material of said wedge shaped light pipe have a high index of refraction.

10. The display improvement of claim 9 wherein the material of both said supporting material and said wedge shaped light pipe is a transparent plastic material.

11. The display improvement of claim 9 wherein said light reflector is a metal coating on said supporting material.

12. The display improvement of claim 10 wherein said light source is a light bulb located in a bore that is off the center of said circular light reflector.

* * * * *